No. 839,786. PATENTED DEC. 25, 1906.
C. P. SESTER.
GEARING.
APPLICATION FILED DEC. 15, 1902.
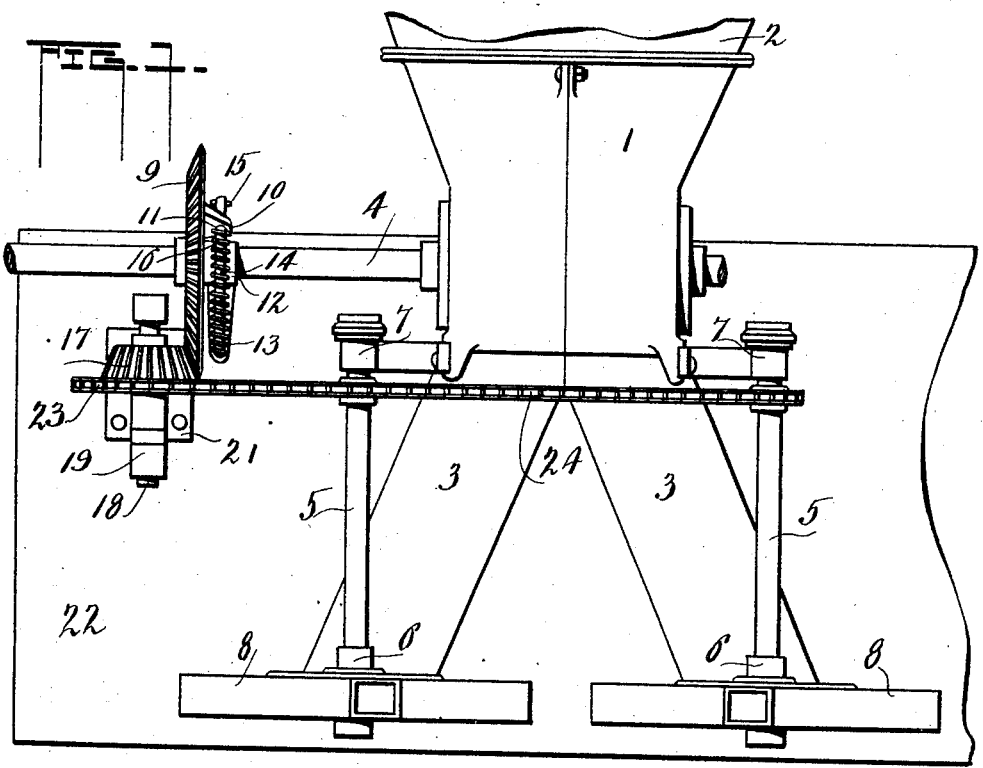
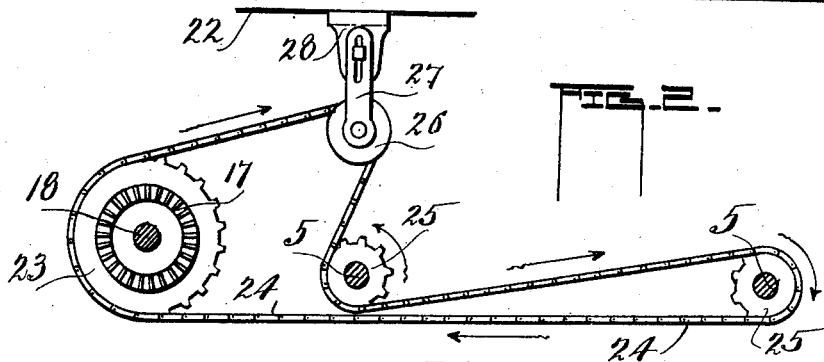
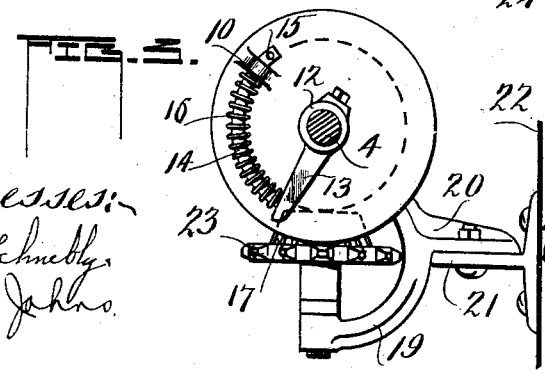
Witnesses:
H. B. Schmebly
C. E. Johns
Inventor:
Charles P. Sester
By Thos. H. LaPont
Atty.

UNITED STATES PATENT OFFICE.

CHARLES P. SESTER, OF PEORIA, ILLINOIS, ASSIGNOR, BY MESNE ASSIGNMENTS, TO J. A. ENGEL AND CO., OF PEORIA, ILLINOIS, A CORPORATION OF ILLINOIS.

GEARING.

No. 839,786.     Specification of Letters Patent.    Patented Dec. 25, 1906.

Application filed December 15, 1902. Serial No. 135,337.

*To all whom it may concern:*

Be it known that I, CHARLES P. SESTER, a citizen of the United States, residing at Peoria, in the county of Peoria and State of Illinois, have invented certain new and useful Improvements in Gearing; and I do hereby declare that the following is a full, clear, and exact description of the invention, which will enable others skilled in the art to which it appertains to make and use the same.

This invention has reference to gearing, and has for its object a drive applicable to seeding and like machines.

The object of the present invention is to provide a drive between a driving and a driven shaft or shafts, and relates more particularly to a driving device comprising a bevel-gear loosely carried on the drive-shaft and has yielding connections with means secured to a drive-shaft for imparting power to said gear, and, further, providing a bevel-pinion meshing with the aforesaid bevel-gear on the drive-shaft and a drive-sprocket attached to and forming a part of the bevel-pinion and having connection by means of a chain drive with suitable driven shaft or shafts.

The invention is herein shown as applied for driving the distributing-shafts of an end-gate seeding-machine, but may be used in other connections wherever such a form of gearing is desired.

In the drawings, Figure 1 is an elevation of one form of seeding device supported by an end gate with my drive mechanism attached thereto. Fig. 2 is a detached view in plan of the driving devices. Fig. 3 is a detached view in elevation and cross-section, showing particularly the bevel-gear loosely mounted on the drive-shaft and yielding connections between the shaft and gear.

In the figures like numerals indicate corresponding parts.

As stated above, for convenience in illustrating the manner of applying and operating a drive such as I show I employ an end-gate seeder having two-fan shafts or distributing-shafts, and embodying in the seeder structure I show a driving-shaft, and between the driving-shaft and distributing-shaft I locate the gear which actuates the distributers.

While I have shown two fan or distributing shafts, I do not wish to limit myself to such a structure, as the same driving mechanism may be employed for actuating one fan-shaft, or the devices may be employed in other and various ways for transmitting power from a driving to a driven shaft. The object which I have in illustrating the drive in connection with a seeding-machine of the end-gate variety is because the drive-shaft is rotated through connection made with the ground-wheels of a vehicle, and when the gear is employed for transmitting power from the drive to the driven shafts the sudden start of the driving-shaft is such that it ofttimes happens that the teeth of the wheels or chains, if they are employed in driving, are placed under such a strain that they break and render the driving devices useless; but by employing a driving device on the drive-shaft which has yielding connections with the shaft (and the same may be placed in motion smoothly and without jar) and providing such connection as I show with a gear on the drive-shaft I can very easily transmit power from a horizontally-arranged drive-shaft to a vertically-disposed distributing fan-shaft.

1 indicates a seeding-machine, to which is attached a hopper 2, and depending from and having communication with seeding devices in said hopper are converging boots or spouts 3.

4 refers to a drive-shaft which is journaled in the seeder-frame and is designed to carry seeding devices thereon, (not shown,) and the opposite end of the shaft has connections with a suitable source of power. In a seeder of this class it derives its power from the ground-wheels of a vehicle; but I do not wish to confine myself to such an application of the power. 5 refers to vertically-disposed fan or distributing shafts journaled to the base of spouts at 6 and in bearings 7 at their upper ends, and on the lower ends of shafts 5 and rotating beneath the boots or spouts 3 are fans or distributers 8. The functions of the end-gate seeder are too well known to require further description by me.

9 indicates a bevel-gear loosely mounted on the power-shaft 4, and on its rear face it is provided with a lug extension 10, having an aperture 11, and 12 indicates a collar or sleeve adapted to be carried on the driving-shaft 4 and in juxtaposition to the rear face of the bevel-gear 9 and is designed to be secured on and rotated with the shaft 4. Extending from the collar 12 integral therewith is an arm 13, and extending from the arm 13 and attached thereto or forming a part thereof is a rod 14, which is bent into the form of an arc from the center of the driving-shaft 4, and the free end of this rod 14 passes and has movement through the perforation 11 in the lug 10 of the bevel-gear, and 15 is a cotter-pin or similar device passing through the end of the rod outside of the lug for the purpose of holding the rod in position shown in the figure to prevent its being disengaged from the lug. On this rod 14 is carried a coil-spring 16, which bears between the arm 13 of the collar 12 and the lug 10 of the bevel 9.

17 indicates a bevel-gear carried upon a short vertically-disposed shaft 18, which has bearing in the bifurcated extension 19 of the bracket 20, and the bracket in turn is suitably supported on a support 21, in this instance attached to the end gate 22, designed for supporting the seeding devices. The bevel-pinion 17, as shown, meshing with the bevel-gear 9, is adapted to receive its power therefrom, and carried upon the short shaft 18, which may be integral with the pinion 17, is shown a sprocket-wheel 23, and 24 is a drive-chain carried around and actuated by the sprocket 23 and pinions 25, and the said guide is carried by a support 27, which is adjustably mounted on a second support 28, attached to the end gate 22, the object of the guide being to take up any slack in the chain and for the further purposes of guiding the chain when applied to vertically-disposed distributing devices, such as illustrated herein.

While I have shown and described a sprocket-and-chain connection between the driving device and distributing mechanism, it is to be understood that, if desired, a belt, cable, or similar drive may be employed which will serve the same purpose and accomplish the same results as the sprockets and chain herein.

Having thus fully described my invention, what I claim, and desire to secure by Letters Patent of the United States, is—

1. In gearing, the combination of the horizontal driving-shaft, the two vertically-disposed driven shafts, sprocket-pinions, one on each of the driven shafts, a bevel-wheel carried on the driving-shaft and yielding connections between the gear and shaft, a supplemental shaft, a bevel-pinion on said shaft meshing with the bevel-wheel on the drive-shaft, a sprocket-wheel carried by said supplemental shaft, and a chain connecting the sprocket with the pinions on the driven shafts, substantially for the purposes set forth.

2. In gearing, the combination of the horizontal driving-shaft, one or more vertically-disposed driven shafts, a bevel gear-wheel loosely carried on the driving-shaft, an arm fixed on said driving-shaft and yielding driving connections between said arm and said bevel-gear, a short supplemental shaft, a bevel-pinion carried thereby and meshing with the bevel-gear on the drive-shaft, a sprocket on the supplemental shaft, a pinion on the upper end of the driven shaft or shafts, and a chain traveling around the sprocket and pinion aforesaid, substantially as and for the purposes set forth.

In testimony whereof I affix my signature in presence of two witnesses.

CHARLES P. SESTER.

Witnesses:
 HENRY OELKERS,
 ROBERT N. MCCORMICK.